Oct. 25, 1932.  C. G. OLSON  1,884,158
MILLING CUTTER
Filed June 10, 1929
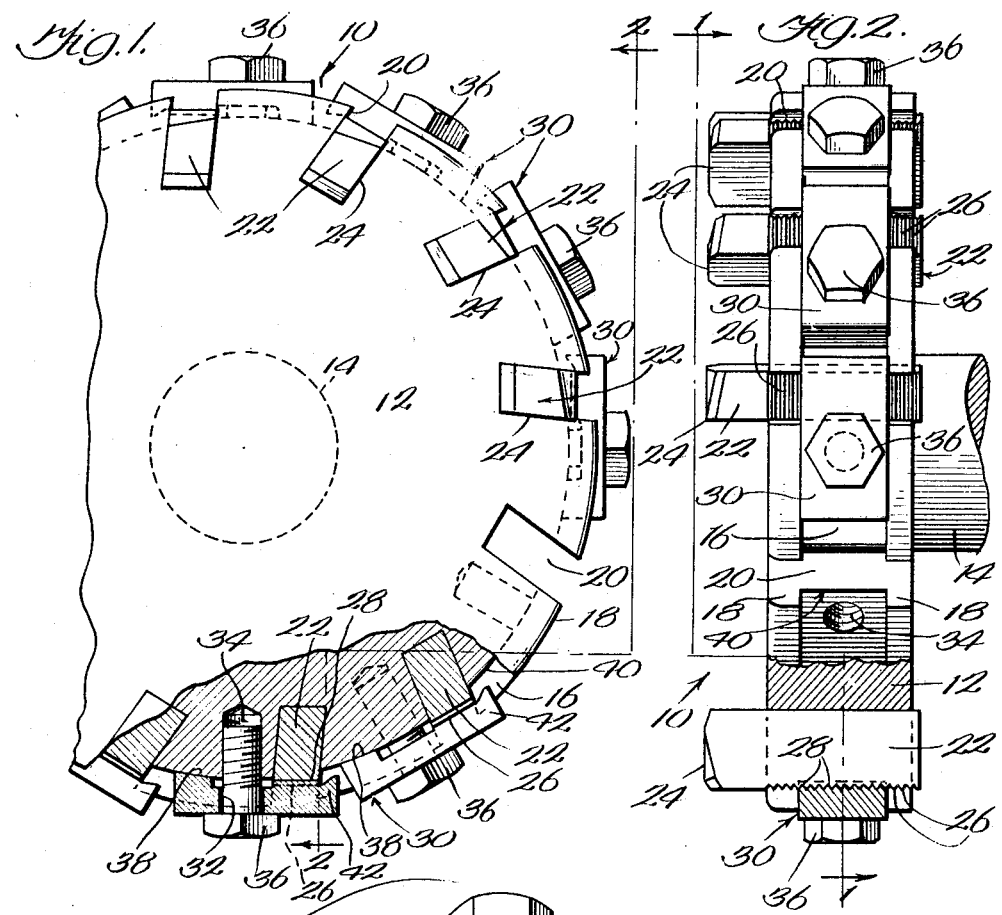
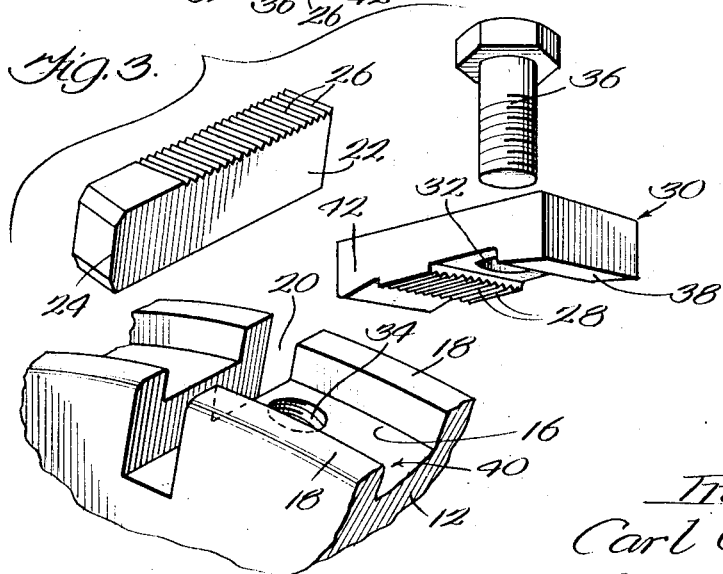
Inventor
Carl G. Olson
By Cheever, Cox & Moore
Attys Patented Oct. 25, 1932

1,884,158

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

MILLING CUTTER

Application filed June 10, 1929. Serial No. 369,602.

My invention relates generally to milling cutters and more particularly to milling cutters of the inserted tooth type.

One of the primary objects of my present invention is to provide milling cutters of the inserted tooth type having tooth or blade securing means of improved practical construction.

More specifically, my invention contemplates the provision of simple and efficiently operable means whereby the inserted blades may be positively secured against radial as well as transverse displacement with respect to the cutter body.

Still more specifically it is an object of my invention to provide clamping means peripherally positioned upon the cutter body which are adapted to frictionally engage the outer surfaces of the inserted blades and thereby positively secure said blades in proper operative positions.

It is a further object of my invention to so arrange the above mentioned peripherally positioned blade clamping means in such a manner as to enable their quick assemblage or disassemblage with respect to the cutter body and to this end I propose to peripherally configurate the cutter body so as to provide a guide-way for receiving said clamping means and for securing said clamping means against axial displacement with respect to the cutter body.

In addition to the above mentioned advantageous characteristics my invention contemplates configurating or serrating the outer surfaces of the inserted teeth and a surface of the clamping means companion thereto, the interlocking of said parts serving as an effective means for securing the blades in position.

These and numerous other objects and advantages will be more apparent from the following detailed description when considered in connection with the accompanying drawing, wherein:

Figure 1 is a fragmentary view of an inserted tooth milling cutter which is constructed in accordance with the teachings of my invention, said view being taken substantially along line 1—1 of Figure 2;

Figure 2 is a side view of the milling cutter disclosed in Figure 1, said view being taken substantially along the line 2—2 of Figure 1; and Figure 3 is an exploded perspective view of the inserted blade and clamping means therefor, said parts being shown in association with a fragmentary portion of the cutter body.

Referring now to the drawing more in detail wherein like numerals have been employed to designate similar parts throughout the various figures, it will be observed that for the purpose of illustrating one embodiment of my invention I have shown an inserted tooth milling cutter which is designated generally by the numeral 10. This milling cutter comprises a body portion 12 which is adapted to be mounted upon the rotary spindle 14 of a driving mechanism such as a milling machine (not shown). This body portion 12 is formed with a peripheral annular groove or recess 16, said groove being presented between a pair of annular flanges or abutments 18. Extending transversely of the cutter body 12 at spaced intervals is a plurality of slots 20 which slots are designed to receive companion cutter blades or teeth 22.

One extremity of each of these blades 22 presents a work engaging tooth 24 which is adapted, when the blade is properly seated within its companion slot, to project laterally of the cutter body as clearly shown in Figure 2. The upper surface of each of the blades 22 is formed with a plurality of serrations or teeth 26 and these teeth are designed to interlock with similar teeth 28 provided on the underside of a clamping member 30.

This clamping member 30 is of such a width as to be snugly received within the groove 16 between the abutments or flanges 18 as clearly shown in Figure 2. After a blade 22 has been seated within its companion slot, the clamping member 30 may be inserted within the groove 16 so as to bring an aperture 32 in said clamping member into substantial registration with a threaded aperture 34 which opens into the groove 16. A suitable clamping screw 36 may then be passed through the aperture 32 and tightened within the threaded aperture 34. Each of the clamping members 30 is provided with a bearing surface 38 which is designed to conform substantially to the contour of the surface 40 of the cutter body at the bottom of the groove 16. Thus, when the member 30 is clamped in position with the teeth 28 thereof interlocking with the teeth 26 of the companion blade, the surface 38 will be clamped against the surface 40 as clearly shown in Figure 1. It is also to be noted that the clamping member 30 is provided with a projecting portion 42 and this projection extends into the portion of the annular groove 16 positioned adjacent the slot 20. Thus, the clamping member rests within portions of the groove 16 positioned on opposite sides of the slot 20 so as to positively secure said member 30 against lateral displacement.

In assembling the various parts constituting the above described milling cutter, a blade is first inserted within its companion seat or slot and then a clamping member 30 is inserted within the groove 16. After the blade has been projected outwardly from the cutter body to a desired predetermined degree, the teeth or corrugations 28 of the clamping member are carried into operative interlocking association with the companion corrugations or teeth 26 of the blade and the screw 36 is tightened so as to clamp the parts in position. All of the blades are thus positioned and secured within the cutter body. It will be apparent that adjustment of the blades transversely of the cutter body may be readily effected by loosening the clamping members so as to effect the disengagement of the corrugations or teeth 26 and 28.

From the foregoing description it will be understood that my invention contemplates the provision of blade clamping means which is very practical and simple in construction. A minimum number of parts is required to positively secure the blades in position and these parts may be very economically manufactured. The corrugations or serrations provided in the blades and clamping member serve not only to effectively and positively secure the blades against longitudinal displacement but also to facilitate the adjustment of the blades. In other words, after the blades have been subjected to considerable wear or for some other reason it is desired to shift the position of the blades, these serrations enable the longitudinal adjustment of the blades to be conveniently effected. The annular flanges or abutments between which the clamping members are seated provide very rigid means for securing the clamping members in proper position. Furthermore, the peripheral groove provided in the cutter body greatly facilitates the ease with which the clamping members may be associated with the cutter body. Obviously, these clamping members 30 may be used in connection with cutter bodies not provided with the annular flanges and in such instances the clamping and interlocking action of the members 30 is sufficient to retain the inserted blades in proper position.

Having thus described my invention, what I claim as new and desire to secure by Letters Patent is:

1. In a milling cutter of the class described, a cylindrical cutter body having a plurality of transverse blade receiving slots, a substantially radial cutting blade in each of said slots, said blades being provided with circumferentially extending serrations, a clamping member associated with each blade having corresponding circumferential serrations, whereby said blade may be adjusted axially of the cutter body, and means for tightening said clamping members against the blades.

2. A face milling cutter including a cylindrical body portion, a plurality of slots extending transversely of said body portion and disposed in substantially radial direction, a cutting blade in each of said slots, said cutting blade having a cutting edge adapted to be positioned to one side of said cylindrical body portion, said blades being provided with circumferentially extending serrations, a clamping member for each blade provided with complementary circumferential serrations, whereby said blades may be adjustably secured in various axial positions, and a tightening screw associated with each clamping member for securing said clamping members against the outer surface of their respective blades.

In witness whereof, I have hereunto subscribed my name.

CARL G. OLSON.